US012534560B2

(12) United States Patent
Alanazi et al.

(10) Patent No.: US 12,534,560 B2
(45) Date of Patent: Jan. 27, 2026

(54) COPOLYMERS OF (3-ACRYLAMIDOPROPYL)TRIMETHYL AMMONIUM CHLORIDE AS CORROSION INHIBITOR INTERMEDIATE

(71) Applicant: Saudi Arabian Oil Company, Dhahran (SA)

(72) Inventors: Nayef M. Alanazi, Dhahran (SA); Muhammad Imran Ul-haq, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 545 days.

(21) Appl. No.: 18/059,627

(22) Filed: Nov. 29, 2022

(65) Prior Publication Data

US 2023/0167221 A1  Jun. 1, 2023

Related U.S. Application Data

(60) Provisional application No. 63/283,735, filed on Nov. 29, 2021.

(51) Int. Cl.
C08F 293/00 (2006.01)
C09D 5/08 (2006.01)
C09D 133/14 (2006.01)

(52) U.S. Cl.
CPC .............. *C08F 293/00* (2013.01); *C09D 5/08* (2013.01); *C09D 133/14* (2013.01)

(58) Field of Classification Search
CPC ........ C08F 293/00; C09D 5/08; C09D 133/14
USPC ........................................... 525/93; 507/222
See application file for complete search history.

(56) References Cited

U.S. PATENT DOCUMENTS

| | | | |
|---|---|---|---|
| 3,623,979 | A | 11/1971 | Maddox, Jr. et al. |
| 3,629,104 | A | 12/1971 | Maddox, Jr. et al. |
| 4,515,708 | A | 5/1985 | Haselgrave et al. |
| 4,673,436 | A | 6/1987 | Haselgrave et al. |

(Continued)

FOREIGN PATENT DOCUMENTS

| | | |
|---|---|---|
| AU | 2014296417 B2 | 2/2015 |
| EP | 1690960 A2 | 8/2006 |

(Continued)

*Primary Examiner* — Randy P Gulakowski
(74) *Attorney, Agent, or Firm* — DINSMORE & SHOHL LLP

(57) ABSTRACT

A block copolymer including blocks of the general formula:

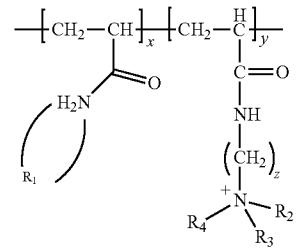

where $R_1$ is a cyclic compound having 5 to 8 atoms; $R_2$, $R_3$, and $R_4$ is a linear or cyclic alkyl group; x is a molar fraction from 0.1 to 0.9; y is a molar fraction from 0.1 to 0.9; a sum of x+y is 1; z is from 1 to 10; and the block copolymer has a molecular weight from 500 Da to 50,000 Da.

23 Claims, 6 Drawing Sheets

(56) References Cited

U.S. PATENT DOCUMENTS

| | | |
|---|---|---|
| 4,744,948 A | 5/1988 | Incorvia |
| 4,784,796 A | 11/1988 | Treybig et al. |
| 5,225,524 A | 7/1993 | Plochocka et al. |
| 5,292,480 A | 3/1994 | Fischer et al. |
| 5,611,991 A | 3/1997 | Naraghi |
| 5,993,693 A | 11/1999 | Meyer |
| 6,118,000 A | 9/2000 | Frenier |
| 6,303,079 B1 | 10/2001 | Meyer |
| 7,057,050 B2 | 6/2006 | Meyer |
| 7,951,754 B2 | 5/2011 | Tiwari et al. |
| 9,382,467 B2 | 7/2016 | Meyer et al. |
| 9,434,911 B2 | 9/2016 | Bennett et al. |
| 9,714,313 B2 | 7/2017 | Custers et al. |
| 9,816,024 B2 | 11/2017 | Jafar Mazumder et al. |
| 9,868,894 B1 | 1/2018 | Jafar Mazumder et al. |
| 10,221,368 B2 | 3/2019 | Benitez Aguilar et al. |
| 10,323,327 B2 | 6/2019 | Obot et al. |
| 10,604,710 B2 | 3/2020 | Moloney |
| 2009/0260820 A1* | 10/2009 | Kurian et al. |
| 2010/0219379 A1 | 9/2010 | Acosta et al. |
| 2013/0112106 A1 | 5/2013 | Malwitz et al. |
| 2013/0233543 A1 | 9/2013 | Overkempe et al. |
| 2018/0282606 A1 | 10/2018 | Rodgers et al. |
| 2019/0194376 A1* | 6/2019 | Maejima et al. ... C08F 299/024 |
| 2020/0318243 A1 | 10/2020 | Obot et al. |
| 2021/0171687 A1 | 6/2021 | Ul-Haq et al. |
| 2022/0243121 A1* | 8/2022 | Shanmugam et al. |
| 2022/0290008 A1* | 9/2022 | Goto et al. ............. C09K 23/00 |

FOREIGN PATENT DOCUMENTS

| | | | |
|---|---|---|---|
| JP | 08282092 A | 10/1996 | |
| JP | 2011140448 A | 7/2011 | |
| WO | 199803395 A1 | 1/1998 | |
| WO | 2014016350 A1 | 1/2014 | |
| WO | 2015002988 A1 | 1/2015 | |
| WO | WO 2021/131198 * | 1/2021 | |
| WO | WO-2021131198 A1 * | 7/2021 | ............. C08L 53/00 |

* cited by examiner

COPOLYMERS OF (3-ACRYLAMIDOPROPYL)TRIMETHYL AMMONIUM CHLORIDE AS CORROSION INHIBITOR INTERMEDIATE

CROSS REFERENCE TO RELATED APPLICATIONS

This application claims priority to U.S. Provisional Patent Application No. 63/283,735 that was filed on Nov. 29, 2021 and is incorporated herein by reference in its entirety.

BACKGROUND

Field

The present disclosure relates to a corrosion inhibitor for sweet and sour environments. In particular, the present disclosure is related to copolymers formed from (3-acrylamidopropyl)trimethyl ammonium chloride as a corrosion inhibitor.

Technical Background

The presence of corrosive species such as $H_2S$, $CO_2$, organic acids, and brine solutions in produced oil creates an aggressively corrosive environment for transportation pipelines and oil processing facilities in the oil and gas industry. Two types of corrosion prevalent in such environments are sweet ($CO_2$-induced) corrosion and sour ($H_2S$-induced) corrosion. Once dissolved in water, both $CO_2$ and $H_2S$ behave like weak acids and can cause oxidation, which promotes steel corrosion. This corrosion can cause severe damage on the internal walls of production and transportation pipelines, which are mostly steel-based materials. Sweet and sour corrosion leads to many risks, such as pipeline leakages and even bursting, resulting in unplanned turnaround maintenance time and costs.

Organic compounds, known as inhibitors, are usually added into aggressive and mostly aqueous corrosive environments to inhibit metal corrosion. Many of the corrosion inhibitors deployed for use in oilfields exhibit marked toxic and non-biodegradable properties. While several other inhibitors exhibit appreciable environmental acceptability and high efficiency, the cost of their production poses strong challenges to their industrial application.

Some conventional corrosion inhibitors are film formers based on nitrogen-containing compounds. These corrosion inhibitors retard metallic corrosion by adsorbing onto the metal surface to create inhibitory barriers between the metal surface and the corrosive environment. Notable classes of nitrogen-based compounds include imidazolines, amines and even quaternary ammonium salts. Although many corrosion inhibitors have been disclosed and used, satisfactory corrosion inhibition is a challenge with current corrosion inhibitors for sour and sweet environments. There is a growing need for new, efficient, and cost-effective corrosion inhibitor chemistry and composition to inhibit the corrosion in wet sour and/or sweet environments, especially wet sour crude processing facilities.

SUMMARY

The present disclosure relates to a novel and efficient corrosion inhibitor based on block copolymers formed from (3-acrylamidopropyl)trimethyl ammonium chloride, which can reduce the corrosion rate of carbon steel in a wet crude handling facility. Embodiments include using an effective amount of the corrosion inhibitor to protect steel surfaces in wet sour and/or sweet environments commonly found in oil and gas processing facilities, such as gas oil separation plants (GOSPs) and pipelines. In particular, new block copolymers of N-acryloylmorpholine (NAM), N-acryloylpyrrolidine (NAPy), and N-Vinylcaprolactam (NVCL) with a quaternized acrylamide based monomer, (AMPTMA), for corrosion inhibition are disclosed herein.

According to one or more other aspects of the present disclosure, a block copolymer comprises blocks having the general formula of:

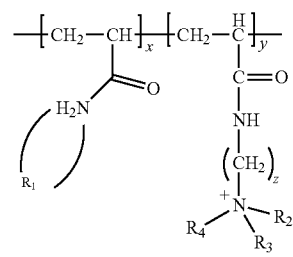

wherein $R_1$ is a cyclic compound having 5 to 8 atoms; $R_2$, $R_3$, and $R_4$ is a linear or cyclic alkyl group; x is a molar fraction from 0.1 to 0.9; y is a molar fraction from 0.1 to 0.9; a sum of x+y is 1; z is from 1 to 10; and the block copolymer has a molecular weight from 500 Da to 50,000 Da.

Additional features and advantages of the technology described in this disclosure will be set forth in the detailed description which follows, and in part will be readily apparent to those skilled in the art from the description or recognized by practicing the technology as described in this disclosure, including the detailed description which follows, the claims, as well as the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

Reference will now be made in greater detail to various embodiments, some embodiments of which are illustrated in the accompanying drawings. Whenever possible, the same reference numerals will be used throughout the drawings to refer to the same or similar parts.

DETAILED DESCRIPTION

Figure 1:
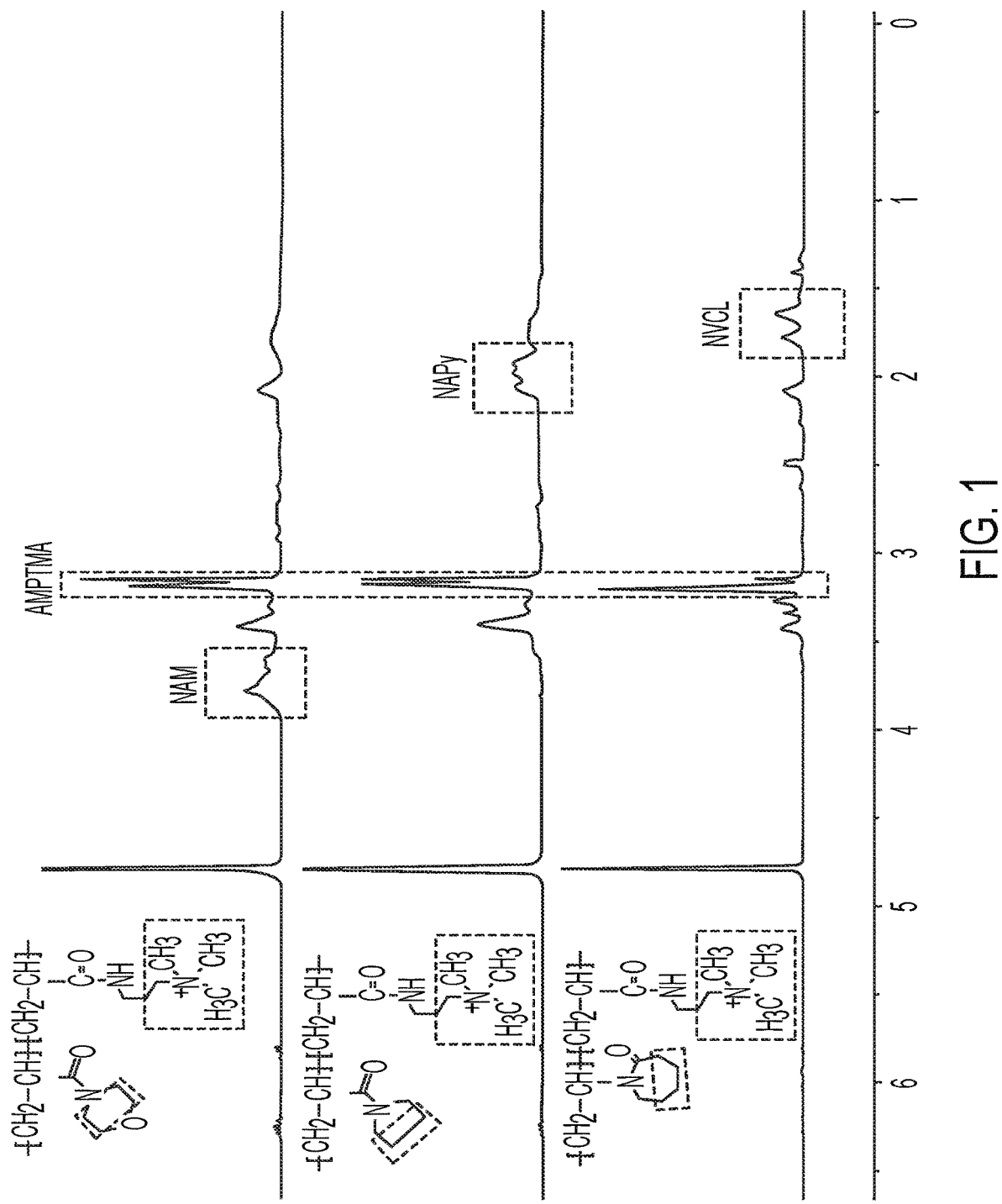
FIG. 1 depicts The NMR analysis of NAM, NAPy, and NVCL compounds according to embodiments disclosed and described herein.

Embodiments described herein provide a corrosion inhibitor that is a block copolymer formed from (3-acrylamidopropyl)trimethyl ammonium chloride to mitigate corrosion especially in an acidic, environment. As described herein, an acidic environment has fluids that include 1% acidic components, 5% acidic components, or higher concentrations. Acidic components may include $H_2S$ and $CO_2$. The polymer based corrosion inhibitor can efficiently mitigate the corrosion during the production, transportation, and processing of in the presence of $H_2S$ and $CO_2$ environment. The copolymers disclosed and described herein comprise ammonium-based constituents that enhance adhesion to metallic surfaces, increasing their corrosion protection over previous polymers.

While the following terms are believed to be well understood by one of ordinary skill in the art, definitions are set forth to facilitate explanation of the present-disclosed subject matter.

The term "copolymer" refers to a polymer having two different monomeric repeating units. In one or more embodiments, the copolymers are random. As will be appreciated by one of ordinary skill in the art, the copolymers are random when the distribution of monomeric repeating units follows statistical laws. For example, copolymers are random when the probability of finding a given monomeric repeating unit at a particular point in the polymer chain is equal to the mole fraction of that monomeric repeating unit in the chain. Random copolymers may also be referred to as statistical copolymers. Similarly, the term "terpolymer" refers to a polymer having three different monomeric repeating units.

The term "monovalent" refers to a radical having an unsatisfied valence of one, where a valence, represented in drawings herein by a "–", is unsatisfied at one end of the radical. For example, when a hydrocarbon group is present at one end of an aliphatic radical or a heteroaliphatic radical, the aliphatic radical or the heteroaliphatic radical is monovalent after one hydrogen atom has been removed from the hydrocarbon group present at one end of the aliphatic radical or the heteroaliphatic radical. As another example, when a heteroatom is present at one end of the heteroaliphatic radical, the heteroaliphatic radical is monovalent when the heteroatom present at one end of the heteroaliphatic radical has an unsatisfied valence.

The term "divalent" refers to a radical having an unsatisfied valence of two, where a valence is unsatisfied at two ends of the radical. For example, when a hydrocarbon group is present at two ends of an aliphatic radical or a heteroaliphatic radical, the aliphatic radical or the heteroaliphatic radical is divalent after one hydrogen atom has been removed from each of the hydrocarbon groups present at the ends of the aliphatic radical or the heteroaliphatic radical. As another example, when a heteroatom is present at two ends of the heteroaliphatic radical, the heteroaliphatic radical is divalent when each of the heteroatoms present at two ends of the heteroaliphatic radical has an unsatisfied valence. Similarly, as another example, when a hydrocarbon group is present at one end of a heteroaliphatic radical and a heteroatom is present at one end of the heteroaliphatic radical, the heteroaliphatic radical is divalent after one hydrogen atom has been removed from the hydrocarbon group present at one end of the heteroaliphatic radical and when the heteroatom present at one end of the heteroaliphatic radical has an unsatisfied valence The term "aliphatic" refers to saturated carbon radicals, which may be in either a linear or branched structure. The aliphatic hydrocarbon radicals may be monovalent or divalent. As described herein, aliphatic includes, but is not limited to, alkyl moieties. Thus, the term "alkyl" includes straight and branched alkyl groups. The term "lower alkyl" may be used to indicate alkyl groups (branched or unbranched) having from 1 to 6 carbon atoms.

In some embodiments, the alkyl groups described contain from 1 to 7 aliphatic carbon atoms. In other embodiments, the alkyl groups described contain from 1 to 5 aliphatic carbon atoms. In still other embodiments, the alkyl groups described contain from 1 to 3 aliphatic carbon atoms. Illustrative aliphatic groups thus include, but are not limited to, for example, methyl, ethyl, n-propyl, isopropyl, allyl, n-butyl, sec-butyl, isobutyl, tert-butyl, n-pentyl, sec-pentyl, isopentyl, tert-pentyl, n-hexyl, sec-hexyl, moieties and the like.

The term "heteroaliphatic" refers to aliphatic radicals in which one or more carbon atoms in the main chain have been substituted with a heteroatom. By way of example, an aliphatic radical having four main chain atoms where one carbon atom has been substituted with one heteroatom is referred to as a $C_4$ heteroaliphatic. As another example, an aliphatic radical having seven main chain atoms where two carbon atoms have been substituted with two heteroatoms is referred to as a $C_7$ heteroaliphatic. In some embodiments, the heteroaliphatic radicals are monovalent or divalent. Thus, heteroaliphatic includes aliphatic chains which contain one or more oxygen, sulfur, or nitrogen atoms, for example, in place of carbon atoms. Heteroaliphatic moieties may be linear or branched.

The term "heterocycloalkyl," "heterocycle," or "heterocyclic" refers to radicals that combine the properties of heteroaliphatic and cyclic moieties and include, but are not limited to, saturated mono- or polycyclic ring systems having from 5 to 8 atoms, where at least one ring atom is a N heteroatom; and where zero, one or two ring atoms are additional heteroatoms independently chosen from S, O, and N. The nitrogen and sulfur heteroatoms may optionally be oxidized. In some embodiments, the terms heterocycloalkyl, heterocycle or heterocyclic refer to non-aromatic 5-membered, 6-membered, or 7-membered rings or polycyclic moieties where at least one ring atom is an N heteroatom, and where zero, one or two ring atoms are additional heteroatoms independently chosen from S, O, and N. The nitrogen and sulfur heteroatoms may optionally be oxidized and the nitrogen atom may be quarternized. This includes, but is not limited to, bicyclic or tricyclic groups. Representative heterocycles include, but are not limited to, heterocycles such as pyrrolidinyl, pyrazolidinyl, imidazolidinyl, piperidinyl, piperazinyl, oxazolidinyl, isoxazolidinyl, morpholinyl, thiazolidinyl, isothiazolidinyl, dithiazolyl, dithiazolidinyl, and azepanyl. In embodiments, the heterocycloalkyls, heterocycles, or heterocyclics are saturated mono- or polycyclic moieties having from 5 to 8 ring atoms of which one ring atom is N. In the mono- or polycyclic moieties, zero, one or two ring atoms are additional heteroatoms independently chosen from S, O, and N. The remaining ring atoms are carbon, and the radicals are joint to the rest of the molecule via an N ring atom, such as, for example, pyrollidinyl, pyrazolidinyl, imidazolidinyl, piperidinyl, piperazinyl, morpholinyl, thiazolidinyl, and azepanyl.

The term "corrosion" refers to a degradation process affecting metals. During corrosion, a metal surface is converted into a different chemical form, such as an oxide, a hydroxide, or a sulfide. Corrosion is usually caused by electrochemical oxidation of the metal surface, but can also be caused by attack from acids, or both. Surface protection may be used to protect from corrosion, including, for example, passivation, galvanization, and other coding techniques. Some metals and alloys are inherently less vulnerable to corrosion, for example, forming protective oxide surfaces. Corrosion may be enhanced in environments that provide conductivity, such as seawater, brines, and the like. Corrosion may also be enhanced by exposure to acidic gases, such as hydrogen sulfide and carbon dioxide.

Corrosion inhibitors disclosed and described herein comprise block copolymers of (3-acrylamidopropyl)trimethyl ammonium chloride. In embodiments the corrosion inhibitor is a block copolymer comprising monomer units with a general formula of $[CH_2—CH(—CO—NR_1)]_x—[CH_2—CH(CO—NH—(CH_2)_z—N—(R_1, R_2, R_3))]$, where x and y are the compositional fractions of the respective monomers in the copolymer, and x+y=1 in the case of copolymers. In one or more embodiments, z is from 1 to 10. $R_1$ is a cyclic compound with 5 to 8 atoms and may, in embodiments, be heterocyclic. In embodiments where $R_1$ is heterocyclic, the heteroatom may be N, O, or S atom(s). $R_1$, $R_2$, and $R_3$ are individually liner or cyclic alkyl groups. In embodiments, the final polymeric corrosion inhibitor has a molecular weight between 500 Daltons (Da) and 50,000 Da.

In embodiments, the monomer units comprising the block copolymer corrosion inhibitor have the following formula:

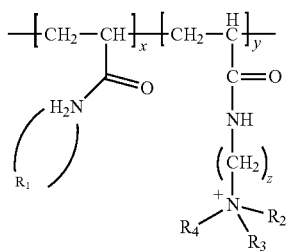

In this structure, x is a molar fraction from 0.1 to 0.9, such as from 0.2 to 0.9, from 0.3 to 0.9, from 0.4 to 0.9, from 0.5 to 0.9, from 0.6 to 0.9, from 0.7 to 0.9, from 0.8 to 0.9, from 0.1 to 0.8, from 0.2 to 0.8, from 0.3 to 0.8, from 0.4 to 0.8, from 0.5 to 0.8, from 0.6 to 0.8, from 0.7 to 0.8, from 0.1 to 0.7, from 0.2 to 0.7, from 0.3 to 0.7, from 0.4 to 0.7, from 0.5 to 0.7, from 0.6 to 0.7, from 0.1 to 0.6, from 0.2 to 0.6, from 0.3 to 0.6, from 0.4 to 0.6, from 0.5 to 0.6, from 0.1 to 0.5, from 0.2 to 0.5, from 0.3 to 0.5, from 0.4 to 0.5, from 0.1 to 0.4, from 0.2 to 0.4, from 0.3 to 0.4, from 0.1 to 0.3, from 0.2 to 0.3, or from 0.1 to 0.2. Accordingly, y is a molar fraction from 0.1 to 0.9, such as from 0.2 to 0.9, from 0.3 to 0.9, from 0.4 to 0.9, from 0.5 to 0.9, from 0.6 to 0.9, from 0.7 to 0.9, from 0.8 to 0.9, from 0.1 to 0.8, from 0.2 to 0.8, from 0.3 to 0.8, from 0.4 to 0.8, from 0.5 to 0.8, from 0.6 to 0.8, from 0.7 to 0.8, from 0.1 to 0.7, from 0.2 to 0.7, from 0.3 to 0.7, from 0.4 to 0.7, from 0.5 to 0.7, from 0.6 to 0.7, from 0.1 to 0.6, from 0.2 to 0.6, from 0.3 to 0.6, from 0.4 to 0.6, from 0.5 to 0.6, from 0.1 to 0.5, from 0.2 to 0.5, from 0.3 to 0.5, from 0.4 to 0.5, from 0.1 to 0.4, from 0.2 to 0.4, from 0.3 to 0.4, from 0.1 to 0.3, from 0.2 to 0.3, or from 0.1 to 0.2.

In embodiments, z is from 1 to 10, such as from 2 to 10, from 3 to 10, from 4 to 10, from 5 to 10, from 6 to 10, from 7 to 10, from 8 to 10, from 9 to 10, from 1 to 9, from 2 to 9, from 3 to 9, from 4 to 9, from 5 to 9, from 6 to 9, from 7 to 9, from 8 to 9, from 1 to 8, from 2 to 8, from 3 to 8, from 4 to 8, from 5 to 8, from 6 to 8, from 7 to 8, from 1 to 7, from 2 to 7, from 3 to 7, from 4 to 7, from 5 to 7, from 6 to 7, from 1 to 6, from 2 to 6, from 3 to 6, from 4 to 6, from 5 to 6, from 1 to 5, from 2 to 5, from 3 to 5, from 4 to 5, from 1 to 4, from 2 to 4, from 3 to 4, from 1 to 3, from 2 to 3, or from 1 to 2.

In embodiments, the block copolymer corrosion inhibitors have multiple functional groups and heteroatoms, such as N and S, to provide multiple sites of interaction with the metal surface to form a stable corrosion inhibition film. In one or more embodiments, the block copolymer corrosion inhibitors have a molecular weight between about 500 Da and about 50,000 Da and work effectively as corrosion inhibitor. In embodiments, the block copolymer corrosion inhibitors have a molecular weight from 1,000 Da to 50,000 Da, from 5,000 Da to 50,000 Da, from 10,000 Da to 50,000 Da, from 15,000 Da to 50,000 Da, from 20,000 Da to 50,000 Da, from 25,000 Da to 50,000 Da, from 30,000 Da to 50,000 Da, from 35,000 Da to 50,000 Da, from 40,000 Da to 50,000 Da, from 45,000 Da to 50,000 Da, from 500 Da to 45,000 Da, from 1,000 Da to 45,000 Da, from 5,000 Da to 45,000 Da, from 10,000 Da to 45,000 Da, from 15,000 Da to 45,000 Da, from 20,000 Da to 45,000 Da, from 25,000 Da to 45,000 Da, from 30,000 Da to 45,000 Da, from 35,000 Da to 45,000 Da, from 40,000 Da to 45,000 Da, from 500 Da to 40,000 Da, from 1,000 Da to 40,000 Da, from 5,000 Da to 40,000 Da, from 10,000 Da to 40,000 Da, from 15,000 Da to 40,000 Da, from 20,000 Da to 40,000 Da, from 25,000 Da to 40,000 Da, from 30,000 Da to 40,000 Da, from 35,000 Da to 40,000 Da, from 500 Da to 35,000 Da, from 1,000 Da to 35,000 Da, from 5,000 Da to 35,000 Da, from 10,000 Da to 35,000 Da, from 15,000 Da to 35,000 Da, from 20,000 Da to 35,000 Da, from 25,000 Da to 35,000 Da, from 30,000 Da to 35,000 Da, from 500 Da to 30,000 Da, from 1,000 Da to 30,000 Da, from 5,000 Da to 30,000 Da, from 10,000 Da to 30,000 Da, from 15,000 Da to 30,000 Da, from 20,000 Da to 30,000 Da, from 25,000 Da to 30,000 Da, from 500 Da to 30,000 Da, from 1,000 Da to 30,000 Da, from 5,000 Da to 30,000 Da, from 10,000 Da to 30,000 Da, from 15,000 Da to 30,000 Da, from 20,000 Da to 30,000 Da, from 25,000 Da to 30,000 Da, from 500 Da to 25,000 Da, from 1,000 Da to 25,000 Da, from 5,000 Da to 25,000 Da, from 10,000 Da to 25,000 Da, from 15,000 Da to 25,000 Da, from 20,000 Da to 25,000 Da, from 500 Da to 20,000 Da, from 1,000 Da to 20,000 Da, from 5,000 Da to 20,000 Da, from 10,000 Da to 20,000 Da, from 15,000 Da to 20,000 Da, from 500 Da to 15,000 Da, from 1,000 Da to 15,000 Da, from 5,000 Da to 15,000 Da, from 10,000 Da to 15,000 Da, from 500 Da to 10,000 Da, from 1,000 Da to 10,000 Da, from 5,000 Da to 10,000 Da, from 500 Da to 5,000 Da, from 1,000 Da to 5,000 Da, or from 500 Da to 1,000 Da.

The polymers also work as combined inhibitor, for example, against both corrosion and gas hydrate. Accordingly, the combined inhibitor application of these polymers eliminate the compatibility issue of these inhibitors with corrosion inhibitors.

In the copolymers described herein, $R^1$ is, in embodiments, selected from divalent $C_5$-$C_8$ aliphatic groups and divalent $C_5$-$C_8$ heteroatom groups. In embodiments, substituents of $C_5$-$C_8$ aliphatic groups, heteroatoms independently chosen from S, N, and O, or combinations thereof may be present. If present, the heteroaliphatic groups of $R^1$ include one or two heteroatoms independently chosen from S, N, and O, wherein the maximum number of heteroatoms is two.

In the copolymers of embodiments, $R^1$ is chosen from divalent $C_5$-$C_8$ aliphatic groups and divalent $C_5$-$C_8$ heteroaliphatic groups, which may be substituted with one or more $C_1$-$C_6$ aliphatic groups, heteroatoms independent chosen from S, N, and O, or combinations thereof, where the divalent $C_5$-$C_8$ heteroaliphatic groups of $R^1$ include one or two heteroatoms independently chosen from S, N, and O, and the maximum number of heteroatoms is two.

In embodiments, $R^1$ is substituted with one or more substituents. In embodiments where substituents are present, $R^1$ may include from 1 to 3 substituting groups. In embodiments where $R^1$ is chosen from divalent $C_5$-$C_8$ aliphatic groups and divalent $C_5$-$C_8$ heteroaliphatic groups and is substituted with one or more substituting groups, the divalent $C_5$-$C_8$ aliphatic groups and the divalent $C_5$-$C_8$ heteroaliphatic groups include additional unsatisfied valences within the divalent $C_5$-$C_8$ aliphatic groups and the divalent $C_5$-$C_8$ heteroaliphatic groups to accommodate bonding with the substituting groups. For example, in embodiments where $R^1$ is chosen from divalent $C_5$-$C_8$ aliphatic groups and divalent $C_5$-$C_8$ heteroaliphatic groups and is substituted, additional hydrogen atoms may have been removed from the hydrocarbon groups present within the divalent $C_5$-$C_8$ aliphatic groups and the divalent $C_5$-$C_8$ heteroaliphatic groups to accommodate bonding with the substituting groups.

In embodiments, $R^1$ is substituted with one or more $C_1$-$C_6$ aliphatic groups, heteroatoms independently chosen from S, N, and O, or combinations thereof. In embodiments, $R^1$ is substituted with one or more $C_1$-$C_6$ linear aliphatic groups, $C_1$-$C_6$ branched aliphatic groups, heteroatoms independently chosen from S, N, and O, or combinations thereof. In embodiments, $R^1$ is substituted with one or more $C_1$-$C_6$ linear aliphatic groups, $C_1$-$C_6$ branched aliphatic groups, or combination thereof. In one or more embodiments, $R^1$ is substituted with one or more lower alkyls. In embodiments, $R^1$ is substituted with one or more $C_1$-$C_3$ linear aliphatic groups, $C_1$-$C_3$ branched aliphatic groups, or combination thereof. In embodiments, $R^1$ is substituted with one or more substituting groups independently chosen from methyl, ethyl, n-propyl, isopropyl, allyl moieties, or combinations thereof.

In one or more embodiments, $R^1$ is substituted with one or more heteroatoms independently chosen from S, N, and O. In embodiments, where $R^1$ is substituted with one or more heteroatoms independently chosen from S, N, and O, the heteroatoms may form a single bond or a double bond with $R^1$. In one or more embodiments, $R^1$ is substituted with one heteroatom chosen from S, N, and O. In embodiments, $R^1$ is substituted with one heteroatom, where the one heteroatom is O.

In embodiments where $R^1$ is a divalent $C_5$-$C_8$ aliphatic group or a divalent $C_5$-$C_8$ heteroaliphatic group, the $C_5$-$C_8$ aliphatic groups and the $C_5$-$C_8$ heteroaliphatic groups include an unsatisfied valence at two ends. In this way, $R^1$ forms a heterocycloalkyl or a heterocycle when bonded with the —N— in the rest of the copolymer molecule via its two unsatisfied end valences. In embodiments, the heterocycloalkyl or heterocycle formed when $R^1$ is bonded with the —N— in the rest of the copolymer is non-aromatic. In one or more embodiments, the heterocycloalkyl or heterocycle formed is chosen from pyrollidinyl, pyrazolidinyl, imidazolidinyl, piperidinyl, piperazinyl, morpholinyl, thiazolidinyl, and azepanyl. In an embodiment, the heterocycloalkyl, or heterocycle formed is chosen from pyrrolidinyl, piperidinyl, morpholinyl, and azepanyl.

Based on the discussion of the possible selections for $R^1$, each of the ring structures, —$NR^1$ can be any of the following structures:

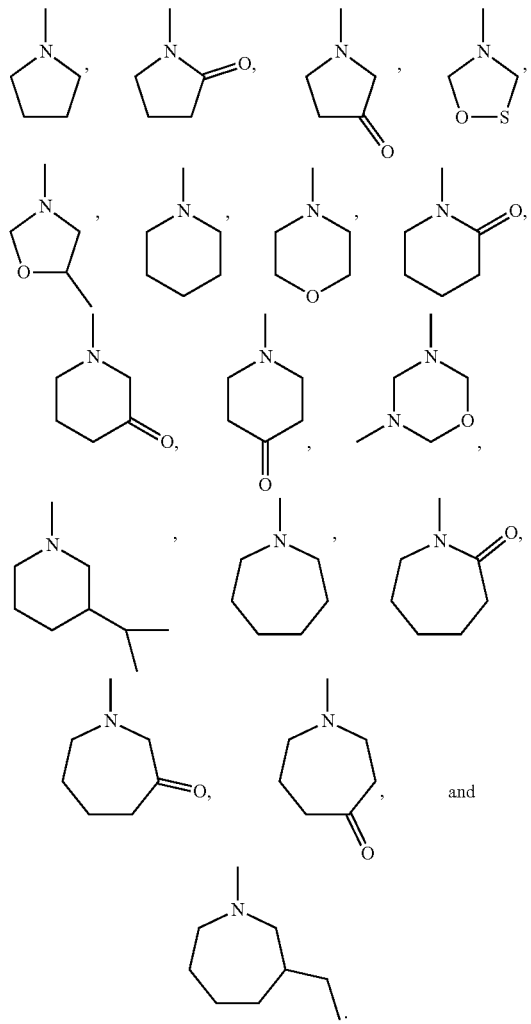

In one or more embodiments, —$NR^1$ is selected from:

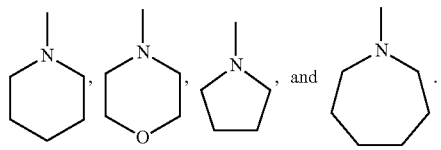

According to embodiments, $R^2$, $R^3$, and $R^4$ may, individually, be either a cyclic alkyl structure or a linear alkyl structure. In embodiments, $R^2$, $R^3$, and $R^4$ may, individually, be a linear alkyl structure comprising from 1 to 12 carbons, such as from 2 to 12 carbons, from 3 to 12 carbons, from 4 to 12 carbons, from 5 to 12 carbons, from 6 to 12 carbons, from 7 to 12 carbons, from 8 to 12 carbons, from 9 to 12 carbons, from 10 to 12 carbons, from 11 to 12 carbons, from 1 to 11 carbons, from 2 to 11 carbons, from 3 to 11 carbons, from 4 to 11 carbons, from 5 to 11 carbons, from 6 to 11 carbons, from 7 to 11 carbons, from 8 to 11 carbons, from 9 to 11 carbons, from 10 to 11 carbons, from 1 to 10 carbons, from 2 to 10 carbons, from 3 to 10 carbons, from 4 to 10 carbons, from 5 to 10 carbons, from 6 to 10 carbons, from 7 to 10 carbons, from 8 to 10 carbons, from 9 to 10 carbons, from 1 to 9 carbons, from 2 to 9 carbons, from 3 to 9 carbons, from 4 to 9 carbons, from 5 to 9 carbons, from 6 to 9 carbons, from 7 to 9 carbons, from 8 to 9 carbons, from 1 to 8 carbons, from 2 to 8 carbons, from 3 to 8 carbons, from 4 to 8 carbons, from 5 to 8 carbons, from 6 to 8 carbons, from 7 to 8 carbons, from 1 to 7 carbons, from 2 to 7 carbons, from 3 to 7 carbons, from 4 to 7 carbons, from 5 to 7 carbons, from 6 to 7 carbons, from 1 to 6 carbons, from 2 to 6 carbons, from 3 to 6 carbons, from 4 to 6 carbons, from 5 to 6 carbons, from 1 to 5 carbons, from 2 to 5 carbons, from 3 to 5 carbons, from 4 to 5 carbons, from 1 to 4 carbons, from 2 to 4 carbons, from 3 to 4 carbons, from 1 to 3 carbons, from 2 to 3 carbons, or from 1 to 2 carbons.

In embodiments, $R^2$, $R^3$, and $R^4$ may, individually, be a cyclic alkyl structure comprising from 3 to 6 carbons, from 3 to 5 carbon atoms, from 3 to 4 carbon atoms, from 4 to 5 carbons, from 4 to 6 carbons, or from 5 to 6 carbons.

When $R^2$, $R^3$, and $R^4$, individually, is a cyclic structure, it may be a heterocyclic ring, such as a nitrogen heterocyclic ring selected as described with respect to $NR^1$ above. In embodiments where is an acyclic structure, $R^2$, $R^3$, and $R^4$ may, individually, be $NH_2$, —OH, —$OCH_3$, —$OCH_2$—$CH_3$, —NH—$CH_2$—$CH_3$ or other substituent based on a heteroatom. In some embodiments. $R^2$, $R^3$, and $R^4$, individually, is a monovalent $C_4$-$C_7$ aliphatic group or a monovalent $C_4$-$C_7$ heteroaliphatic group. In some embodiments, $R^2$, $R^3$, and $R^4$, individually, is substituted with one or more substituents. In embodiments where substituents are present, $R^2$, $R^3$, and $R^4$ may, individually, include from 1 to 3 substituting groups. In embodiments where $R^2$, $R^3$, and $R^4$, individually, is chosen from monovalent $C_4$-$C_7$ aliphatic groups and monovalent $C_4$-$C_7$ heteroaliphatic groups and is substituted with one or more substituting groups, the monovalent $C_4$-$C_7$ aliphatic groups and the monovalent $C_4$-$C_7$ heteroaliphatic groups include additional unsatisfied valences within the monovalent $C_4$-$C_7$ aliphatic groups and the monovalent $C_4$-$C_7$ heteroaliphatic groups to accommodate bonding with the substituting groups. For example, in embodiments where $R^2$, $R^3$, and $R^4$, individually, is chosen from monovalent $C_4$-$C_7$ aliphatic groups and monovalent $C_4$-$C_7$ heteroaliphatic groups and is substituted, additional hydrogen atoms may have been removed from the hydrocarbon groups present within the monovalent $C_4$-$C_7$ aliphatic groups and the monovalent $C_4$-$C_7$ heteroaliphatic groups to accommodate bonding with the substituting groups.

In one or more embodiments, $R^2$, $R^3$ and $R^4$ may, individually, be substituted with one or more $C_1$-$C_6$ aliphatic groups, heteroatoms independently chosen from S, N, and O, or combinations thereof. In some embodiments, $R^2$, $R^3$, and $R^4$, individually, is substituted with one or more $C_1$-$C_6$ linear aliphatic groups. $C_1$-$C_6$ branched aliphatic groups, heteroatoms independently chosen from S, N, and O, or combinations thereof. In some embodiments, $R^2$, $R^3$, and $R^4$ may, individually, be substituted with one or more $C_1$-$C_6$ linear aliphatic groups, $C_1$-$C_6$ branched aliphatic groups, or combination thereof. In some embodiments, $R^3$ is substituted with one or more lower alkyls. In some embodiments, $R^2$, $R^3$, and $R^4$, individually, is substituted with one or more $C_1$-$C_3$ linear aliphatic groups, $C_1$-$C_3$ branched aliphatic groups, or combinations thereof. In some embodiments. $R^2$, $R^3$, and $R^4$ may, individually, be substituted with one or more substituting groups independently chosen from methyl, ethyl, n-propyl, isopropyl, allyl moieties, or combinations thereof.

In one or more embodiments, $R^2$, $R^3$, and $R^4$ may, individually, be substituted with one or more heteroatoms independently chosen from S. N, and O. In embodiments, where $R^2$, $R^3$, and $R^4$, individually, is substituted with one or more heteroatoms independently chosen from S, N, and O, the heteroatoms may form a single bond or a double bond with $R^3$. In embodiments, $R^2$, $R^3$, and $R^4$ may, individually, be substituted with one heteroatom chosen from S, N, and O. In embodiment, $R^2$, $R^3$, and $R^4$, individually, is substituted with one heteroatom, where the one heteroatom is O.

Corrosion inhibitors that are block copolymers as disclosed and described herein can be used in oil and gas processing facilities to improve the corrosion rate as calculated by Equation (1) below, and the Inhibition Efficiency Percentage as calculate by Equation (2):

$$\text{Corrosion Rate (mm/year)} = \frac{8.76 \times \Delta W}{D \times A \times T} \qquad \text{EQ. (1)}$$

where $\Delta W$ is the weight loss of coupon in mg, D is the density of the standard mild steel coupon (C-1018) (7.89 g/cm$^3$), A is an area of the exposed coupon (cm$^2$), and T is the exposure time (two days).

$$\text{Efficiency \%} = \frac{\text{uninhibited Corrosion Rate} - \text{inhibited Corrosion Rate}}{\text{uninhibited Corrosion Rate}} \qquad \text{EQ. (2)}$$

where Uninhibited Corrosion Rate is the corrosion rate as calculated by Equation (1) without a corrosion inhibitor and Inhibited Corrosion Rate is the corrosion rate with an inhibitor.

In embodiments, the Inhibition Efficiency Percentage is greater than 80%, such as greater than 82%, greater than 85%, greater than 88%, greater than 90%, greater than 92%, or greater than 95%.

Aspect 1 is a block copolymer comprising blocks having the general formula of:

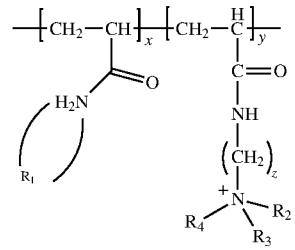

wherein $R_1$ is a cyclic compound having 5 to 8 atoms; $R_2$, $R_3$, and $R_4$ is a linear or cyclic alkyl group; x is a molar fraction from 0.1 to 0.9; y is a molar fraction from 0.1 to 0.9; a sum of x+y is 1; z is from 1 to 10; and the block copolymer has a molecular weight from 500 Da to 50,000 Da.

Aspect 2 is the block copolymer of aspect 1, wherein $R_1$ is a heterocyclic compound.

Aspect 3 is the block copolymer of any one of aspect 1 or aspect 2, wherein $R_1$ is a heterocyclic compound comprising at least one of N, S, and O.

Aspect 4 is the block copolymer of any one of aspects 1 to 3, wherein $R_1$ is selected from divalent $C_5$-$C_8$ aliphatic groups and divalent $C_5$-$C_8$ heteroaliphatic groups, optionally substituted with one or more $C_1$-$C_6$ aliphatic groups, heteroatoms independently chosen from S, N, and O, or combination thereof, wherein the divalent $C_5$-$C_8$ heteroaliphatic groups of $R_1$ comprise one or two heteroatoms independently chosen from S, N, and O, and the maximum number of heteroatoms in $R_1$ is two.

Aspect 5 is the block copolymer of any one of aspect 1 to aspect 4, wherein $R_1$ is selected from the following structures:

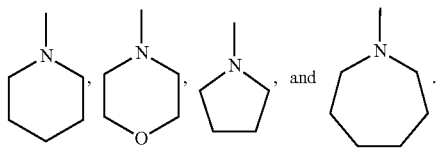

Aspect 6 is the block copolymer of any one of aspect 1 to aspect 5, wherein $R_1$ is a piperidine ring.

Aspect 7 is the block copolymer of any one of aspect 1 to aspect 6, wherein $R_1$ is a pyrrolidine ring.

Aspect 8 is the block copolymer of any one of aspect 1 to aspect 7, wherein x is from 0.3 to 0.7 and y is from 0.3 to 0.7.

Aspect 9 is the block copolymer of any one of aspect 1 to aspect 8, wherein x is from 0.4 to 0.6 and y is from 0.4 to 0.6.

Aspect 10 is the block copolymer of any one of aspect 1 to aspect 9, wherein z is from 1 to 8.

Aspect 11 is the block copolymer of any one of aspect 1 to aspect 10, wherein z is from 1 to 3.

Aspect 12 is the block copolymer of any one of aspect 1 to aspect 11, wherein $R_2$, $R_3$, and $R_4$ are individually selected from linear alkyl groups.

Aspect 13 is the block copolymer of aspect 12, wherein $R_2$, $R_3$, and $R_4$ are individually selected from methyl, ethyl, propyl, and butyl groups.

Aspect 14 is the block copolymer of aspect 12, wherein $R_2$, $R_3$, and $R_4$ are methyl groups.

Aspect 15 is the block copolymer of any one of aspect 1 to aspect 14, wherein $R_2$, $R_3$, and $R_4$ are individually selected from cyclic alkyl groups.

Aspect 16 is the block copolymer of any one of aspect 1 to aspect 15, wherein the block copolymer has a molecular weight from 5,000 Da to 30,000 Da.

Aspect 17 is a method for inhibiting corrosion comprising: contacting a metal with at least one block copolymer comprising blocks having the general formula of:

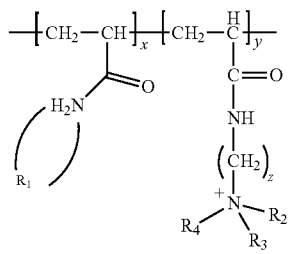

wherein $R_1$ is a cyclic compound having 5 to 8 atoms; $R_2$, $R_3$, and $R_4$ is a linear or cyclic alkyl group; x is a molar fraction from 0.1 to 0.9; y is a molar fraction from 0.1 to 0.9; a sum of x+y is 1; z is from 1 to 10; and the block copolymer has a molecular weight from 500 Da to 50,000 Da.

Aspect 18 is the method of aspect 17, wherein the block copolymer is added to a fluid that is in contact with the metal.

Aspect 19 is the method of any one of aspect 17 or aspect 18, wherein the fluid comprises a brine.

Aspect 20 is the method of any one of aspect 17 to aspect 19, wherein the fluid comprises $CO_2$, $H_2S$, or combinations thereof.

Aspect 21 is the method of any one of aspect 17 to aspect 20, wherein the fluid comprises crude oil or natural gas.

Aspect 22 is the method of any one of aspect 17 to aspect 21, wherein the inhibition Efficiency Percentage is greater than 80%.

Aspect 23 is the method of any one of aspect 17 to aspect 22, wherein the Inhibition Efficiency Percentage is greater than 90%.

EXAMPLES

Example 1

Materials and Methods

The following solvents and chemicals were used as received from the supplier (Sigma-Aldrich): acryloyl chloride, piperidine, pyrrolidine, 3-acrylamidopropyl trimethyl ammonium chloride, trimethylamine $(CH_3)_3N$, 4,4.-Azobis (4-cyanovaleric acid), thioglycolic acid, diethyl ether, methanol and deuterated solvents (deuterium oxide ($D_2O$) and deuterated chloroform ($CDCl_3$)).

Nuclear Magnetic Resonance (NMR) Spectroscopy

The synthesized polymers were characterized using $^1$H-NMR spectroscopy. A JEOL 500 MHz NMR spectrometer was utilized to obtain spectra using appropriate acquisition parameters. The $^1$H-NMR analyses were carried in $CDCl_3$. The $^1$H-NMR analysis confirmed the structures of new block copolymers of (3-acrylamidopropyl) trimethyl ammonium chloride compounds.

Electrospray Mass Spectrometry Analysis (ESI-MS)

Mass spectra were acquired using a 6320 TOF MS (Agilent Technologies, USA), equipped with an Electrospray ionization (ESI) source, operated in the positive mode, and Mass Hunter workstation software (Agilent Technologies, USA). The samples were dissolved in methanol (MeOH) to a final concentration of 0.01 mg/mL (Chromasolv grade, Sigma Aldrich, USA). In some cases, the ionization was enhanced by the addition of lithium trifluoroacetate solution (1 µg/L) in the ratio 100:1 (sample: salt) (v/v). The samples were delivered by a syringe pump at a flow rate of 120 µL/h.

Preparation of Poly(N-acryloylmorpholine-co-(3-acrylamidopropyl)trimethyl Ammonium Chloride The copolymers of AMPTMA with acryloyl type monomers were prepared using a free radical initiator to initiate the polymerization reaction, and thioglycolic acid was used as a chain transfer agent to obtain the low molecular weight copolymers as shown in the reaction mechanisms below.

In a typical copolymerization reaction; 4,4'-Azobis (4-cyanovaleric acid) (350 mg, 1.25 mmol) was added to a solution of acryloyl based monomer or N-Vinyl caprolactam (4.54 g, 36.3 mmol), 3-acrylamidopropyl trimethyl ammonium chloride monomer (5.05 g, 36.3 mmol) and thioglycolic acid (995 mg, 10.8 mmol) in water (42 mL) under $N_2$. The reaction mixture was heated at 63° C. under $N_2$ for 8 h. After 8 hours of reaction time, the reaction mixture was cooled to 5° C. The aqueous phase of the solution was washed with diethyl ether three times (3×20 mL) and freeze-dried to obtain copolymers as a solid to get like material depending on monomers (Yield: 80-87%).

The higher solubility of monomers and final polymer in an aqueous medium lead to higher conversion, and a controlled molecular weight and polydispersity index (PDI).

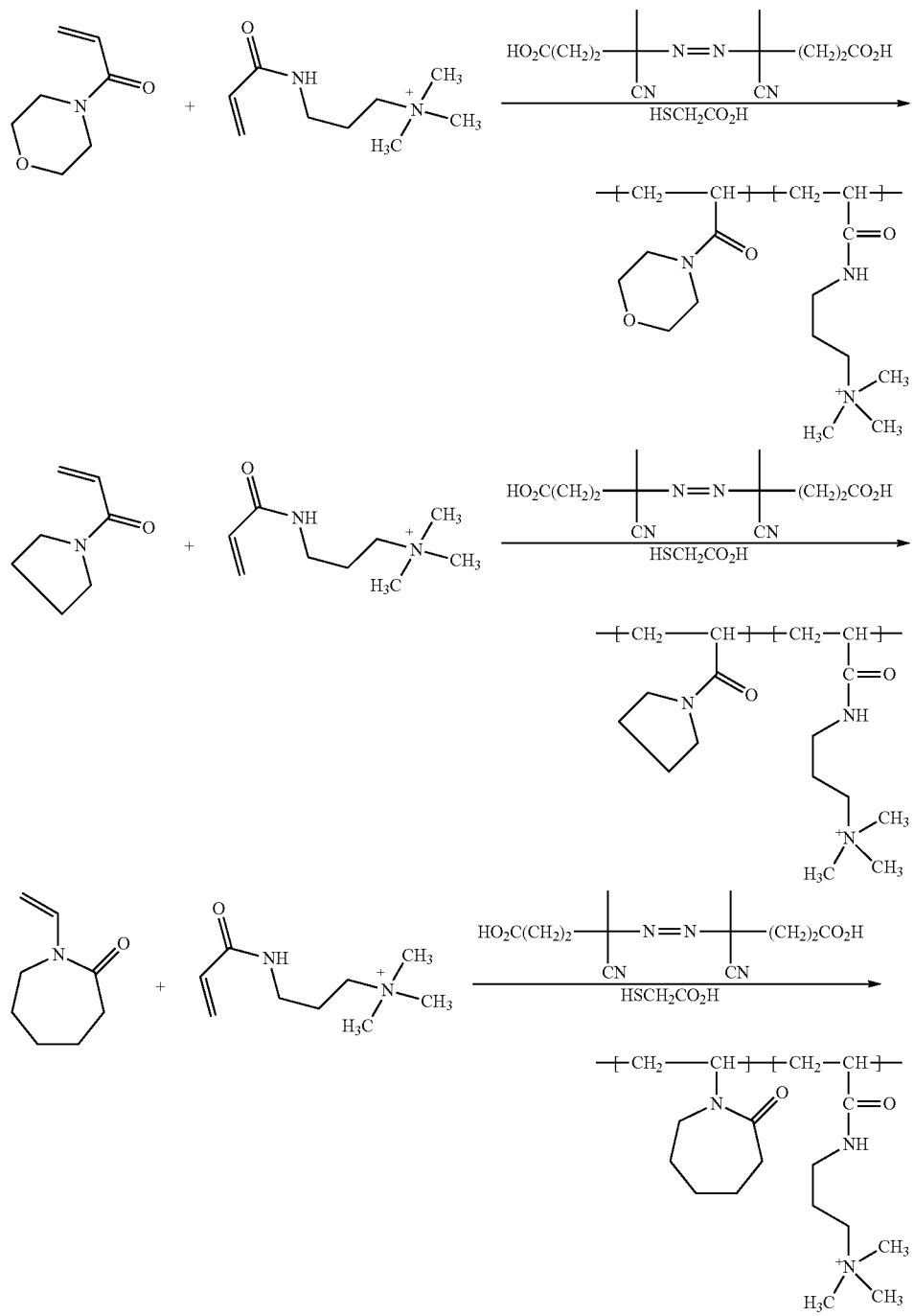

$^1$H-NMR Spectra of New Block Copolymers (3-acrylamidopropyl)trimethyl Ammonium Chloride Compounds The NMR analysis as shown in FIG. 1 confirmed the structure of the synthesized block copolymers of AMPTMA compounds. In FIG. 1, $^1$H-NMR spectrum of Poly(N-acryloylmorpholine-co-(3-acrylamidopropyl) trimethyl ammonium chloride compound are shown, and the dotted lines indicate the protons and the corresponding peaks used to determine incorporation.

The relative content or incorporation of monomers in a copolymer was calculated by the integration of the peak of monomer pendant groups: $CH_2$ signal (4 protons) of NAPy at 1.8-2.2 ppm, $CH_2$ signal (8 protons) of NAM at 3.5-3.9 ppm, $CH_2$ signal (6 protons) of NVCL at 1.5-1.9 ppm and $CH_3$ signal (9) of AMPTMA at 3.1-3.3 ppm. The chemical shift for each monomer unit in the polymer was identified along with the expected number of protons using homopolymers and/or simple co-polymers. The range of chemical shifts was carefully chosen to minimize the overlap between the signals of the monomer units. In p(NAPy-co-AMPTMA), a contribution from methylene protons from AMPTMA had to be subtracted from the peaks belonging to NAPy. The following Equation (3) was used to calculate the percentage of monomers incorporated in the final copolymer:

$$\% \text{ Monomer } (x) \text{ incorporated} = \left[\left(\frac{I_x}{H_x}\right) / \sum\left(\frac{I_i}{H_i}\right)\right] * 100\% \quad \text{EQ. (3)}$$

where $I_x$ refers to the integral of peaks at the chemical shift of monomer x and $H_x$ is the number of protons expected for that particular peak. Moreover, the number average molar mass ($M_n$) was calculated using equation (4):

$$M_n = \left(\frac{1}{C_T}\right)\left(\frac{[M]}{[T]}\right) \quad \text{EQ. (4)}$$

where CT represents chain transfer constant (≈1), [M] and [T] describe the concentration of monomer and chain transfer agent (ABCA), respectively. Table 1 summarizes the incorporation determined for each of the studied polymers, with spectra included in the Supporting Information. Monomer incorporation was found to match relatively well with the stoichiometric ratio of the monomers added.

TABLE 1

Monomer incorporation determined by $^1$H-NMR spectroscopy. Theoretical molecular weight determined from EQ. (2) and ESI-MS.

| Label | Copolymer | Monomers | Feed Ratio | Measured (%) | Mn (Theo) (Da) | ESI-MS (Da) |
|---|---|---|---|---|---|---|
| NAM | p(NAM-co-AMPTMA) | NAM:AMPTMA | 50:50 | 49:51 | 1170 | 667 |
| NAPy | p(NAPY-co-AMPTMA) | NAPy:AMPTMA | 50:50 | 51:49 | 1115 | 573 |
| NVCL | p(NVCL-co-AMPTMA) | NVCL:AMPTMA | 50:50 | 53:47 | 1160 | 620 |

Example 2

Performance Evaluation Procedure

Potentiodynamic polarization scans were carried out at 25° C. in 3.5 wt. % NaCl standard solution and $CO_2$ gas was purged continuously in the solution to mimic sweet corrosion of oil and gas environment. Standard circular (1 $cm^2$) area of carbon steel coupon was exposed to the solution. The measurements were conducted in the blank and inhibited solution contained concentrations of 1 to 100 ppm. The electrochemical measurements were performed using a conventional three-electrode cell, where the carbon steel was the test electrode, with a saturated calomel electrode (SCE) as a reference electrode, and a mesh platinum counter electrode. Potentiodynamic polarization scan and Electrochemical Impedance Spectroscopy (EIS) techniques were used to assess inhibition film of copolymers of AMPTMA. Before starting the experiments, the test electrode was allowed to stabilize for approximately 60 min. Immediately following the stabilization period, the test electrode was polarized at a scan rate of 0.166 mVs-1 from an initial potential of −0.15 to +0.15 V vs. OCP.

HTHP autoclave rotating cage was used to conduct the corrosion tests under simulated and controlled dynamic field conditions in accordance to ASTM G170. The test material was carbon steel coupons (1018) and the coupons were cleaned and degreased before and after testing following ASTM G1 "Practice for preparing, cleaning and evaluating corrosion test specimen procedure". The coupons were positioned in a fixed cage made out of PEEK material and then mounted in the autoclave. The coupons cage was connected to a mechanical shaft that was set to rotate up to 250 rpm. The autoclave vessel, which is made of Hastelloy C-276, was filled with 1 litter of 3.5 wt. % NaCl standard solution and purged with $N_2$ to remove dissolved oxygen for one hour and pressurized with $CO_2$ gas to 2.5 bar and heated up to 55° C. The developed corrosion inhibitor was examined at 100 ppm concentration for 48 hours of exposure. To simulate the field conditions, the performance of this inhibitor was studied by using a mixture of kerosene and standard brine solution in a 1:1 ratio with and without the presence of a corrosion inhibitor. Then, the brine solution was separated from the mixture for the rotating cage autoclave tests, and the partitioning tenancy test of these inhibitors using High Performance Liquid Chromatography (HPLC). All tests were triplicated to obtain an average corrosion rate. In all tests, the corrosion inhibitor formulations were injected before fixing the coupons in the autoclave. The corrosion rate and Inhibition Efficiency Percentage of the samples were calculated using a weight loss by following Equation (1) and Equation (2) above where D is the density of the standard mild steel coupon (7.89 $g/cm^3$), T is two days, and A is 1 $cm^2$.

Figure 2A:
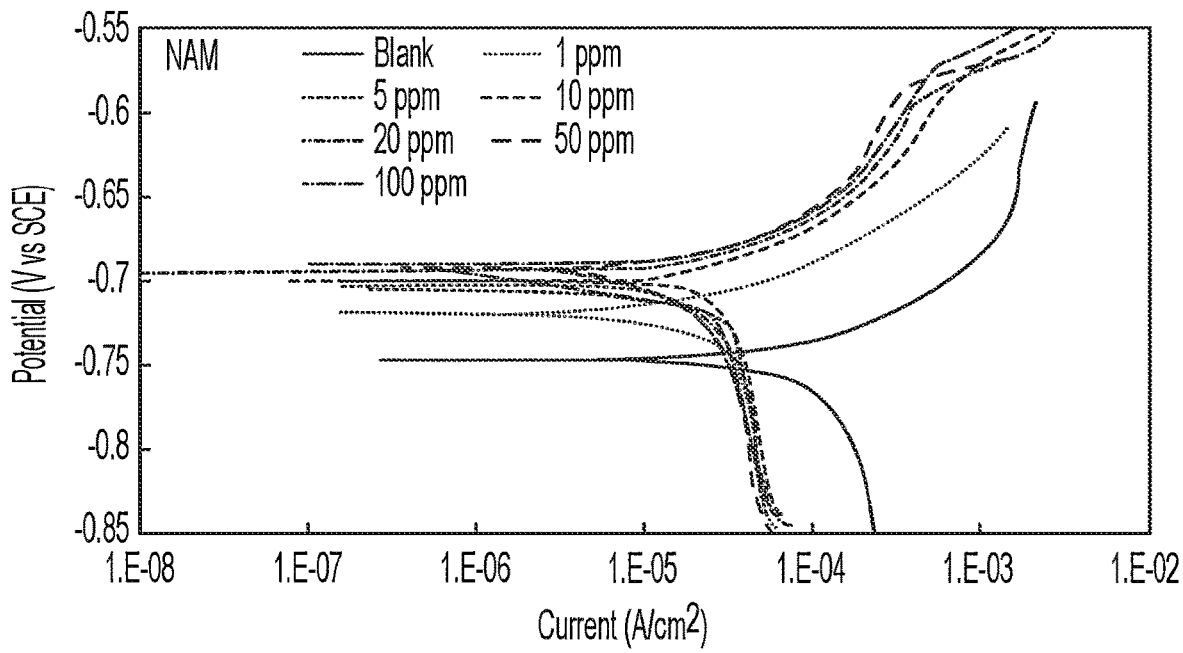
FIG. 2A-2C depict potentiodynamic polarizations scans of NAM, NAPy, and NVCL compounds according to embodiments disclosed and described herein.
Figure 2B:
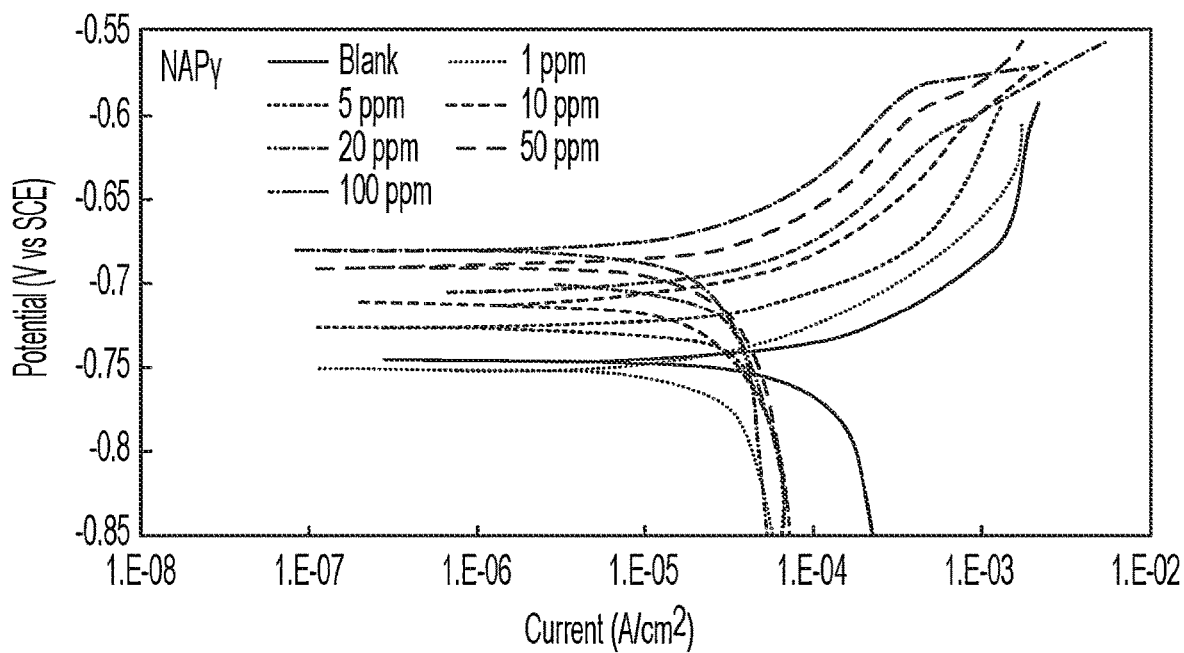
Figure 2C:
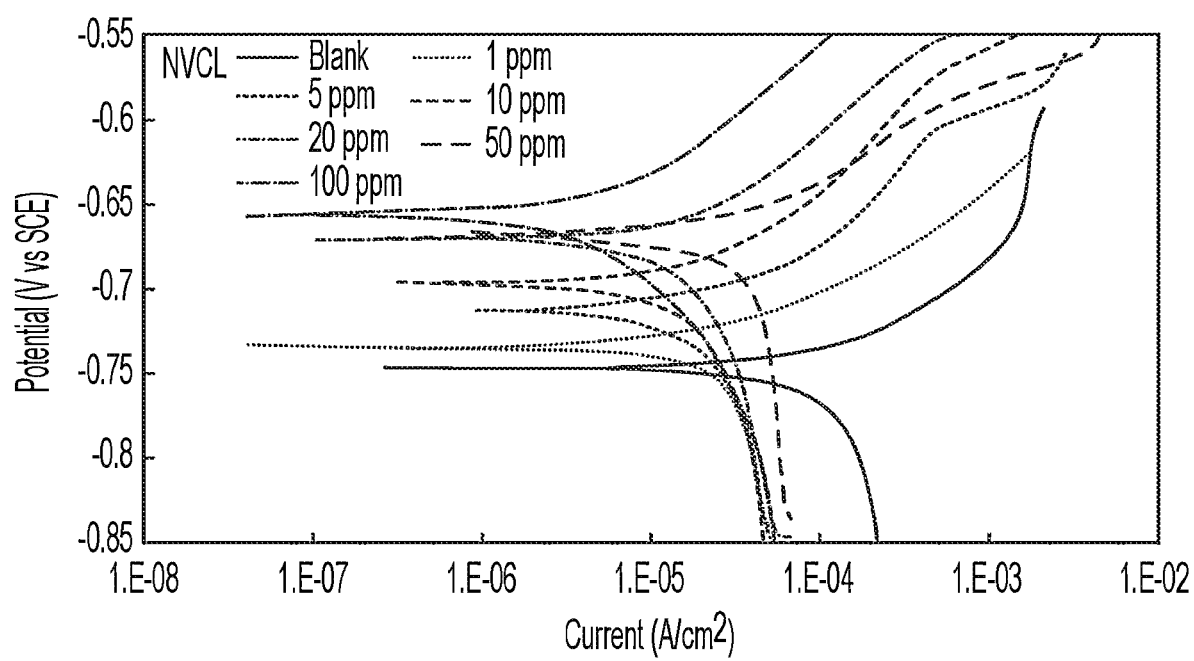

Potentiodynamic polarizations scans are shown in FIG. 2A to FIG. 2C. Specifically, FIG. 2A depicts the scan of NAM, FIG. 2B depicts the scan of NAPy, and FIG. 2C depicts the scan of NVCL. Electrochemical parameters of the copolymers of AMPTMA are shown in Table 2 below.

TABLE 2

Electrochemical Parameters of the Copolymers of AMPTMA

| System | Concentration, ppm | $E_{corr}$, mV vs. SCE | $I_{corr}$, $\mu A \cdot cm^{-2}$ | $\eta$ (%) |
|---|---|---|---|---|
| Blank | — | −750 | 125 | — |
| NAM | 1 | −720 | 44 | 65 |
|  | 5 | −700 | 30 | 76 |
|  | 10 | −705 | 26 | 79 |
|  | 20 | −695 | 20 | 84 |
|  | 50 | −701 | 19 | 85 |
|  | 100 | −692 | 13 | 90 |
| NAPy | 1 | −750 | 38 | 69 |
|  | 5 | −726 | 26 | 79 |
|  | 10 | −712 | 24 | 81 |
|  | 20 | −704 | 18 | 86 |
|  | 50 | −691 | 14 | 89 |
|  | 100 | −680 | 12 | 91 |
| NVCL | 1 | −734 | 26 | 79 |
|  | 5 | −714 | 22 | 83 |
|  | 10 | −698 | 17 | 87 |
|  | 20 | −672 | 12 | 90 |
|  | 50 | −670 | 10 | 92 |
|  | 100 | −657 | 5 | 96 |

The addition of copolymers of AMPTMA shifts both the anodic and cathodic branches of the Tafel plot of the inhibited solution to lower values of current density at all investigated concentrations. This indicates that the copolymers of AMPTMA inhibit both hydrogen evolution and metal dissolution and suggests it act as a mixed type inhibitor. The inhibition efficiency rose with the introduction of successively higher concentrations of the inhibitor molecules, and the copolymers of NVCL and NAPy showed better inhibition performance compared to that of the NAM.

The addition of the NVCL and NAPy to the electrolyte solution produced a noticeable shift in the corrosion potential towards more positive potentials compared to that of the blank and increases positively with increasing concentration of the copolymer. This shift in the potential can be understood to occur as a result of the development of a protective inhibitor film on the metallic substrate. Increasing concentration of NAM more than 5 ppm showed almost parallel lines with no significant change in the slope values. This indicates that the copolymer adsorption on the steel surface does not cause any substantial change in the mechanism of corrosion.

HTHP Autoclave Rotating Cage Tests

The corrosion Inhibition Efficiency Percentage and corrosion rate of blank and disclosed compositions based on new disclosed chemistry are shown in FIG. 4. The corrosion rate of uninhibited solution was extremely high around 65 MPY and several pits were detected on the surface of carbon steel. The maximum pit depth was 28 μm. Accordingly, the average pit penetration rate of uninhibited sample was found to be in a range of 200 MPY. After the addition of the disclosed chemistry compounds, no pitting was observed on steel surfaces and the corrosion rate decreased to reach almost similar or lower than industrial acceptable corrosion rate (5 MPY) under simulated field conditions for a wet sweet environment in the oil and gas industry.

The HPLC results proved that the copolymers are water-soluble, with more than 95% partitioning in the water phase. A small increase in inhibition efficiency of these copolymers in kerosene/water was observed compared to the 100% water system. This increase could be attributed to the tendency of these polymers to hold a tiny amount of kerosene that can provide additional protections. Overall, all the copolymers of AMPTMA against sweet corrosion are very effective to provide excellent corrosion protection under flowing conditions.

Figure 3A:
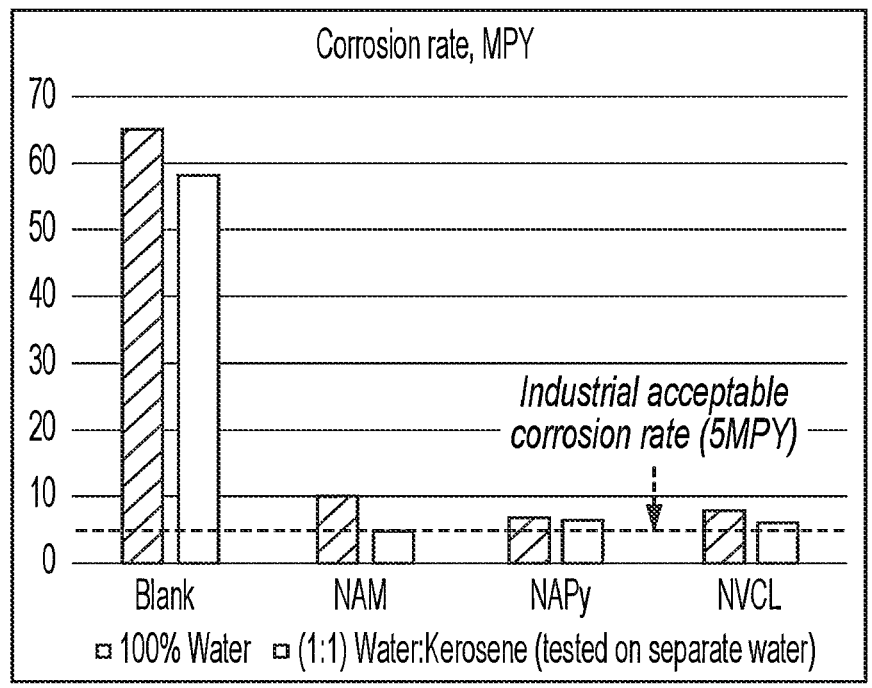
FIG. 3A graphically depicts the corrosion rate of an untreated blank metal coupon, a metal coupon treated with NAM, a metal coupon treated with NAPy, and a metal coupon treated with NVCL according to embodiments disclosed and described herein.
Figure 3B:
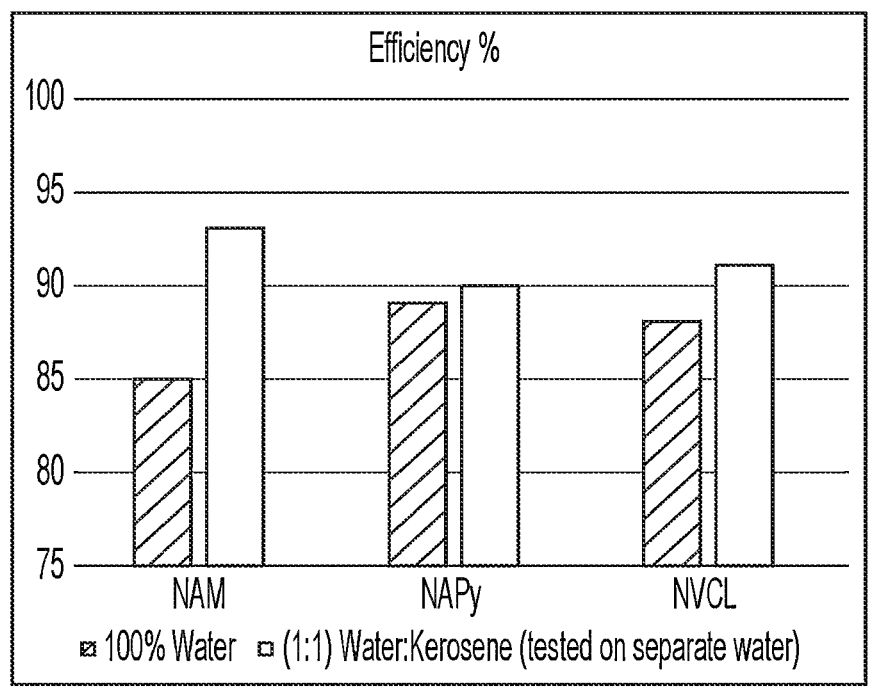
FIG. 3B graphically depicts the Inhibition Efficiency Percentage of an untreated blank metal coupon, a metal coupon treated with NAM, a metal coupon treated with NAPy, and a metal coupon treated with NVCL according to embodiments disclosed and described herein.

FIG. 3A and FIG. 3B shows the corrosion measurements of 100 ppm copolymers of AMPTMA using rotating cage autoclave measurements in $CO_2$-saturated 3.5 wt. % NaCl solution at 55° C., 2.5 bar and 250 RPM after two days of immersion.

Figure 4A:
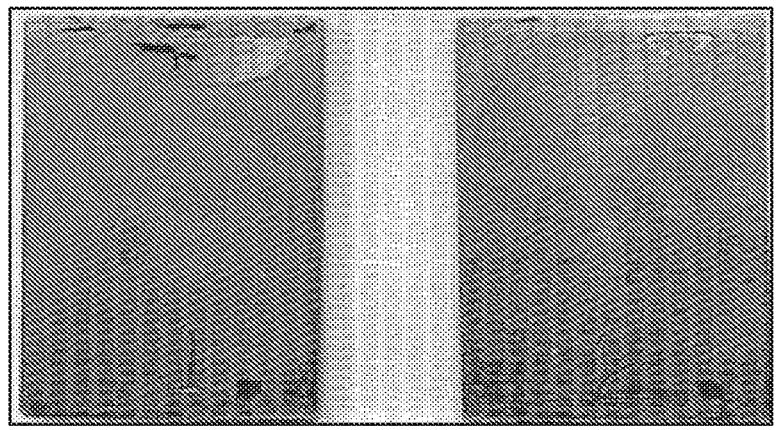
FIG. 4A-FIG. 4D are images showing the corrosion of an untreated blank metal coupon, a metal coupon treated with NAM, a metal coupon treated with NAPy, and a metal coupon treated with NVCL according to embodiments disclosed and described herein.
Figure 4B:
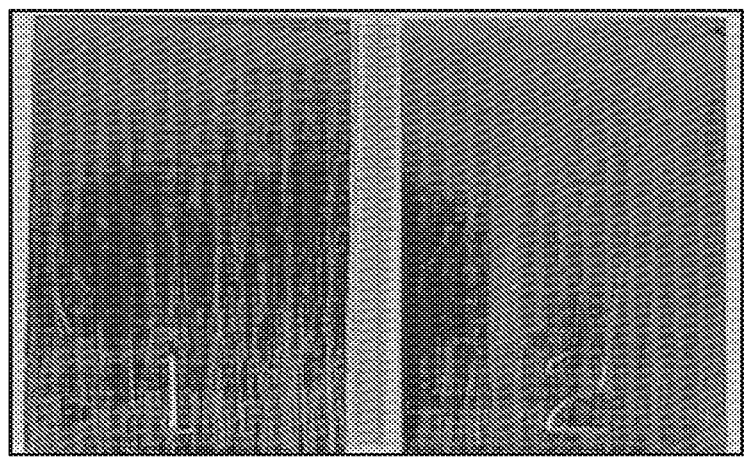
Figure 4C:
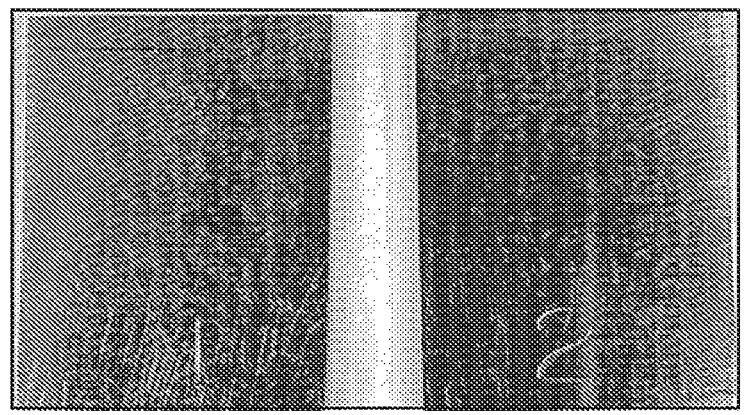
Figure 4D:
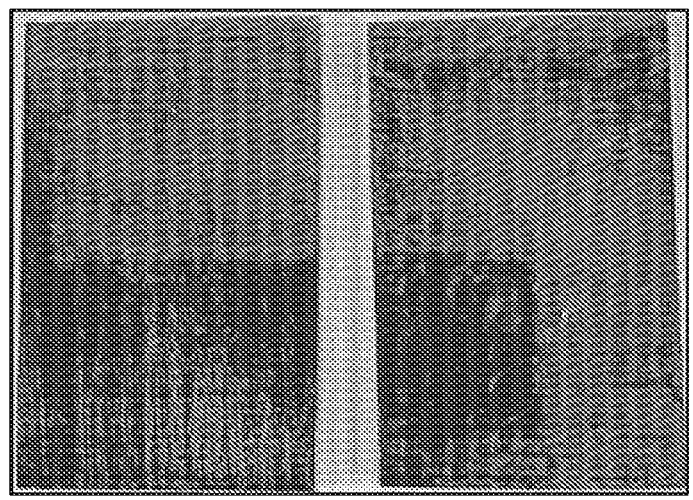

FIG. 4A to FIG. 4D show the appearance of corrosion coupons after testing disclosed corrosion inhibitor at 100 ppm dosage on separate water from (1:1) mixture of water:kerosene. The appearance is after cleaning of the coupon to measure the weight loss. FIG. 4A is a blank coupon; FIG. 4B is coupon treated in NAM; FIG. 4C is coupon treated in NAPy; and FIG. 4D is coupon treated in NVCL.

It is noted that one or more of the following claims utilize the term "wherein" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

It should be understood that any two quantitative values assigned to a property may constitute a range of that property, and all combinations of ranges formed from all stated quantitative values of a given property are contemplated in this disclosure.

Having described the subject matter of the present disclosure in detail and by reference to specific embodiments, it is noted that the various details described in this disclosure should not be taken to imply that these details relate to elements that are essential components of the various embodiments described in this disclosure, even in cases where a particular element is illustrated in each of the drawings that accompany the present description. Rather, the claims appended hereto should be taken as the sole representation of the breadth of the present disclosure and the corresponding scope of the various embodiments described in this disclosure. Further, it will be apparent that modifications and variations are possible without departing from the scope of the appended claims.

What is claimed is:

1. A block copolymer comprising blocks having a general formula of:

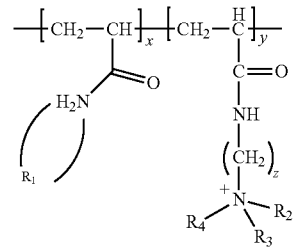

wherein
  $R_1$ is a cyclic group having 5 to 8 atoms;
  $R_2$, $R_3$, and $R_4$ is a linear or cyclic alkyl group;
  x is a molar fraction from 0.1 to 0.9;
  y is a molar fraction from 0.1 to 0.9;
  a sum of x+y is 1;
  z is from 1 to 10; and
  the block copolymer has a molecular weight from 500 Da to 50,000 Da.

2. The block copolymer of claim 1, wherein $R_1$ is a heterocyclic group.

3. The block copolymer of claim 1, wherein $R_1$ is a heterocyclic group comprising at least one of N, S, and O.

4. The block copolymer of claim 1, wherein
  $R_1$ is selected from divalent $C_5$-$C_8$ aliphatic groups and divalent $C_5$-$C_8$ heteroaliphatic groups, optionally substituted with one or more $C_1$-$C_6$ aliphatic groups, heteroatoms independently chosen from S, N, and O, or combination thereof,
  the divalent $C_5$-$C_8$ heteroaliphatic groups of $R_1$ comprise one or two heteroatoms independently chosen from S, N, and O, and
  a maximum number of heteroatoms in $R_1$ is two.

5. The block copolymer of claim 1, wherein —NR$_1$ is selected from:

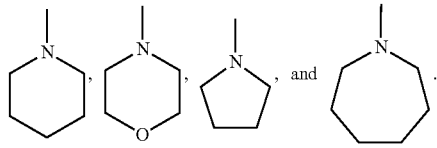

6. The block copolymer of claim 1, wherein R$_1$ creates a piperidine ring.

7. The block copolymer of claim 1, wherein R$_1$ creates a pyrrolidine ring.

8. The block copolymer of claim 1, wherein x is from 0.3 to 0.7 and y is from 0.3 to 0.7.

9. The block copolymer of claim 1, wherein x is from 0.4 to 0.6 and y is from 0.4 to 0.6.

10. The block copolymer of claim 1, wherein z is from 1 to 8.

11. The block copolymer of claim 1, wherein z is from 1 to 3.

12. The block copolymer of claim 1, wherein R$_2$, R$_3$, and R$_4$ are individually selected from linear alkyl groups.

13. The block copolymer of claim 12, wherein R$_2$, R$_3$, and R$_4$ are individually selected from methyl, ethyl, propyl, and butyl groups.

14. The block copolymer of claim 12, wherein R$_2$, R$_3$, and R$_4$ are methyl groups.

15. The block copolymer of claim 1, wherein R$_2$, R$_3$, and R$_4$ are individually selected from cyclic alkyl groups.

16. The block copolymer of claim 1, wherein the block copolymer has a molecular weight from 5,000 Da to 30,000 Da.

17. A method for inhibiting corrosion comprising:
contacting a metal with at least one block copolymer comprising blocks having a general formula of:

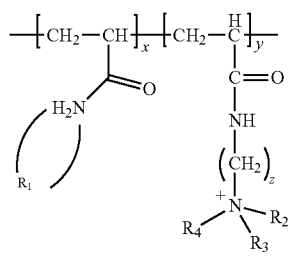

wherein
  R$_1$ is a cyclic group having 5 to 8 atoms;
  R$_2$, R$_3$, and R$_4$ is a linear or cyclic alkyl group;
  x is a molar fraction from 0.1 to 0.9;
  y is a molar fraction from 0.1 to 0.9;
  a sum of x+y is 1;
  z is from 1 to 10; and
  the block copolymer has a molecular weight from 500 Da to 50,000 Da.

18. The method of claim 17, wherein the block copolymer is added to a fluid that is in contact with the metal.

19. The method of claim 18, wherein the fluid comprises a brine.

20. The method of claim 18, wherein the fluid comprises $CO_2$, $H_2S$, or combinations thereof.

21. The method of claim 18, wherein the fluid comprises crude oil or natural gas.

22. The method of claim 17, wherein an Inhibition Efficiency Percentage is greater than 80%.

23. The method of claim 17, wherein an Inhibition Efficiency Percentage is greater than 90%.

* * * * *